Figure 1:
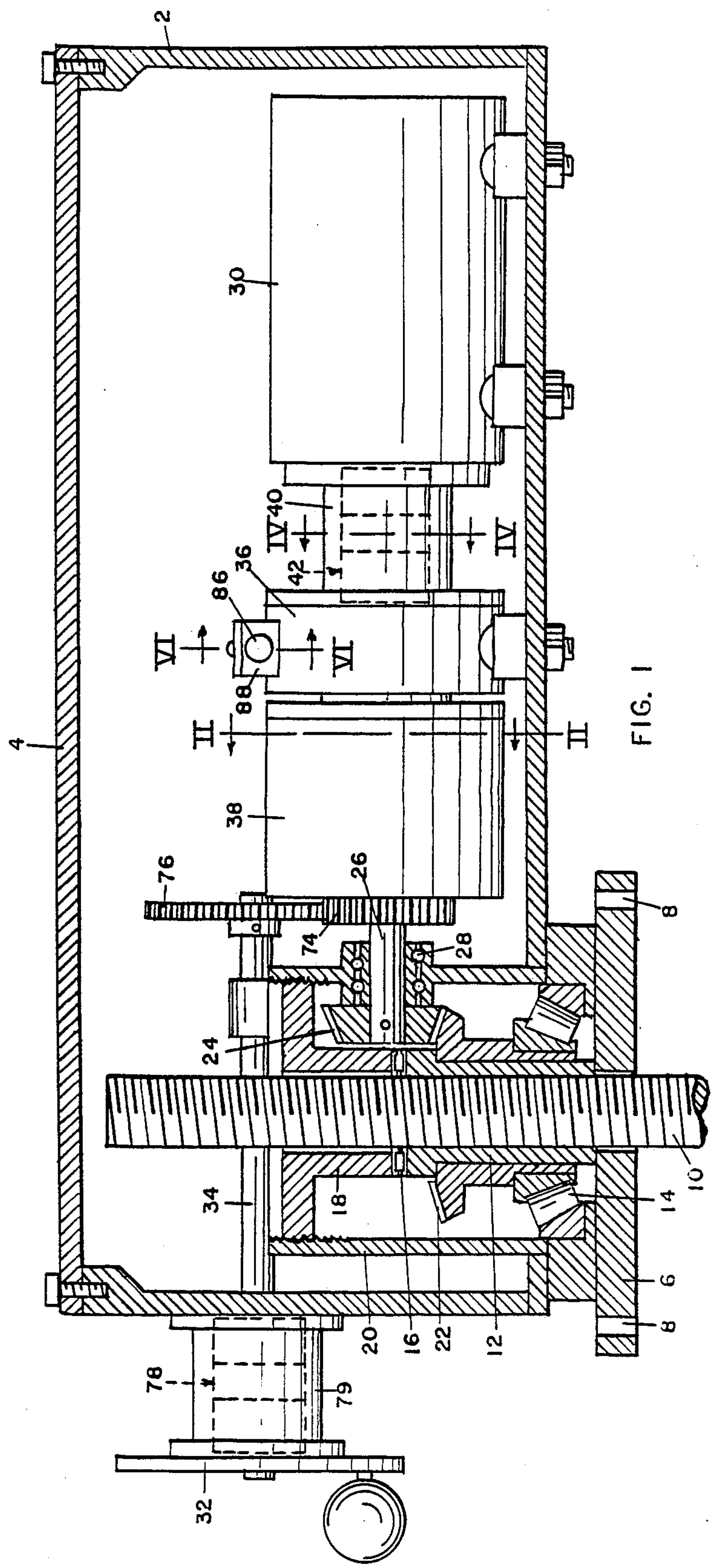

United States Patent [19]

Elliott et al.

[11] Patent Number: 4,760,989

[45] Date of Patent: Aug. 2, 1988

[54] VALVE OPERATOR

[76] Inventors: Lynn T. Elliott, 60 Bendwood; Ronald G. Hune, 830 Oyster Creek Dr., both of Sugar Land, Tex. 77478

[21] Appl. No.: 9,875

[22] Filed: Feb. 2, 1987

[51] Int. Cl.[4] ........................ F16K 31/05; F16K 31/53; F16H 25/02; F16H 37/08

[52] U.S. Cl. .................................... 251/129.03; 74/25; 74/89.15; 74/424.8 VA; 74/626; 74/665 B; 74/665 Q; 74/675; 192/141; 192/150; 251/129.12; 251/229; 251/249.5; 251/267

[58] Field of Search .............. 74/25, 89.15, 424.8 VA, 74/625, 626, 665 B, 665 Q, 674, 675; 192/141, 150; 137/330, 331, 243, 243.1, 243.6; 251/129.03, 129.12, 229, 248, 249.5, 264, 267

[56] References Cited

U.S. PATENT DOCUMENTS

| | | | |
|---|---|---|---|
| 1,996,365 | 4/1935 | Clinedinst | 74/626 |
| 2,481,477 | 9/1949 | Peery | 74/626 |
| 2,912,087 | 11/1959 | Kron et al. | 251/129.12 |
| 3,313,178 | 4/1967 | Saunders | 74/626 |
| 3,505,888 | 4/1970 | Denkowski | 74/89.15 |
| 3,524,526 | 8/1970 | Denkowski | 192/141 |
| 3,712,153 | 1/1973 | East et al. | 74/675 |
| 3,738,183 | 6/1973 | Ball, Jr. et al. | 74/89.15 |
| 3,949,626 | 4/1976 | Berlinger, Jr. et al. | 74/675 |
| 4,261,224 | 4/1981 | Sulzer | 74/626 |
| 4,346,728 | 8/1982 | Sulzer | 137/331 |

FOREIGN PATENT DOCUMENTS

| | | | |
|---|---|---|---|
| 2533333 | 3/1984 | France | 251/249.5 |

*Primary Examiner*—George L. Walton
*Attorney, Agent, or Firm*—Hamilton & Hamilton

[57] ABSTRACT

A valve operator powered selectively either by an electric motor or by a manually operable handwheel, the driving connections from both the motor and the handwheel to the valve including one or more planetary gear sets each having a central pinion rotatable by the motor, a ring gear surrounding the pinion, and planet gears interposed between and meshed with the pinion and the ring gear, the planet gears being rotatable about their own axes and mounted eccentrically on a spider member rotatable about the gear axis, the spider member being operable by its rotation to transmit operating power to the valve being controlled. The ring gears of all of the gear sets are fixed in a rotatable gear case which is turned by the handwheel. A pair of non-reversing torque control devices, disposed respectively between the gear set and the motor, and between the gear set and the handwheel, prevent rotation of the motor by operation of the handwheel, and rotation of the handwheel by operation of the motor.

1 Claim, 2 Drawing Sheets

VALVE OPERATOR

This invention relates to new and useful improvements in valve operators, and has particular reference to valve operators which permit selective operation of the valve controlled thereby either by means of an electric motor, or by manual rotation of a handwheel.

The present invention is directed primarily to two considerations peculiarly applicable to valve operators of this type, that is, operators offering either power operation or manual operation selectively. First, it is important in many applications that the power operation input not be operable to be turned by operation of the manual operation input, and conversely that the manual operation input not be turned by operation of the power operation input. This is important, for example, since if the handwheel is turned for manual operation, and the electric motor is siezed or otherwise locked against rotation, and the handwheel rotation tends to turn the motor, the handwheel will then be locked against rotation and the valve cannot be operated. Conversely, operation of the motor cannot be allowed to turn the handwheel, since if the handwheel has become locked for any reason, the motor cannot function to operate the valve. Also, the handwheel is in some installations, particularly naval installations, operated by reach rods or flexible shafting from remote locations, and rotation thereof by the motor could be highly dangerous. Second, motor operation requires a high ratio of speed reduction from the motor to the valve, since obviously the valve cannot be called upon to operate at motor speeds, while handwheel operation would, if the same high speed reduction ratio were used as in motor operation, require so many turns of the handwheel, and hence require so much time to open or close the valve, as to be totally impractical. It is also desirable, from the point of view of convenience and safety of operation, that switching from motor to handwheel operation, or vice versa, should not require any operation requiring the attention of the user, such as the shifting of a clutch lever or the like.

Accordingly, the primary object of the present invention is the provision of a valve operator which both prevents operation of either the motor drive or the handwheel drive whenever the other drive means is in use, and which also provides a much greater speed reduction ratio in motor operation than in handwheel operation. Generally, this object is accomplished by the provision of a planetary gear set including a central gear pinion rotatable by the drive motor, a ring gear surrounding the pinion and rotatable by the handwheel, a set of planet gears interposed between and meshed with both the central pinion and the ring gear, the planet gears being carried by a spider coaxial with the pinion and ring gear, whereby the epicyclic movement of the planet gears is transmitted to the spider to operate the valve, and a pair of non-reversing or uni-directional torque control devices interposed respectively between the drive motor and the central pinion, and between the ring gear and the handwheel. Additional sets of planetary gear sets may be provided for still greater speed reduction in motor operation, and the speed reduction ratio may be adjusted independently of the motor speed reduction. A non-reversing torque control device, as used herein, is defined as a device operable to transmit torque from a driving member to a driven member, when the former is turned in either direction, but to prevent transmission of torque from the driven member to the driving member, and to lock the driven member against rotation, other than by said driving member.

Another object is the provision of a valve operator of the character described in which the planetary gearing may be so modified as to provide a torque limit switch operable to shut off the drive motor whenever it has either opened or closed the valve with a predetermined degree of torque.

A further object is the provision of a valve operator of the character described which is extremely compact and requires little space, and which is relatively simple and inexpensive as compared to other equipment capable of performing the same functions.

Figure 3:
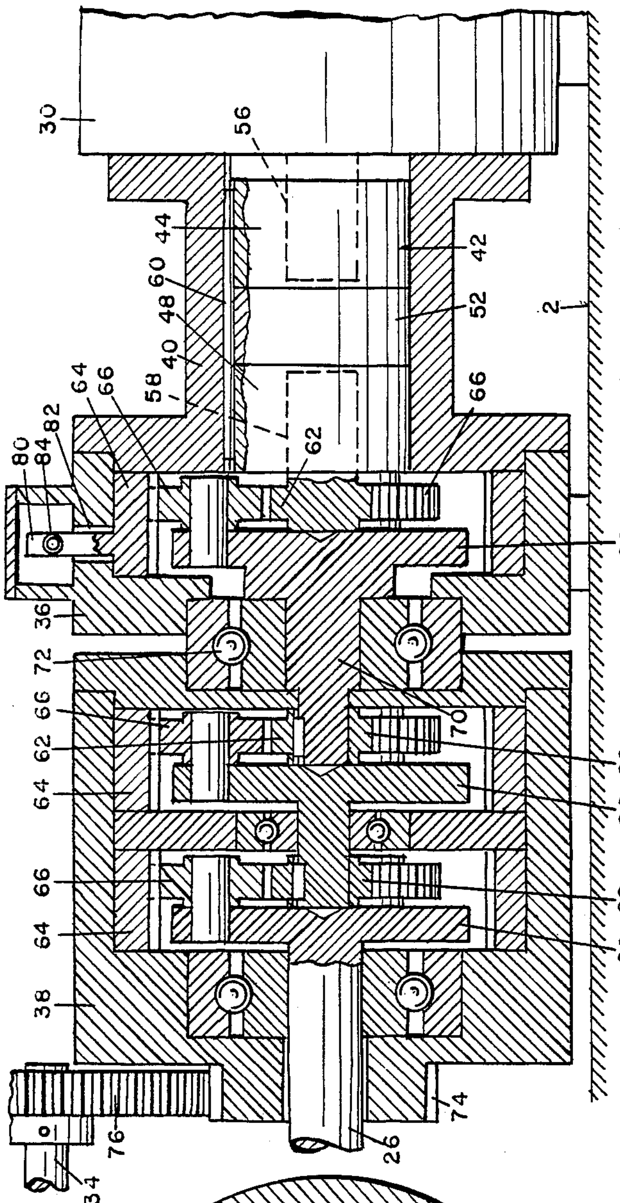
Figure 6:
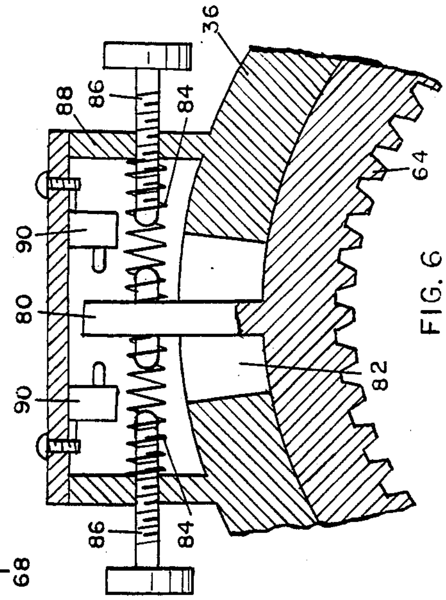
Figure 5:
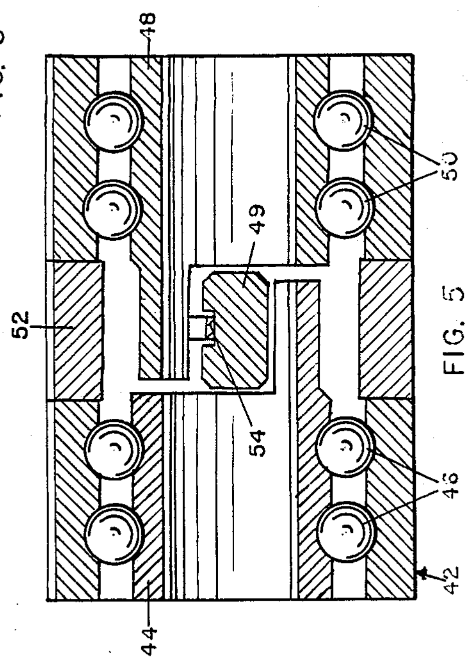
Figure 2:
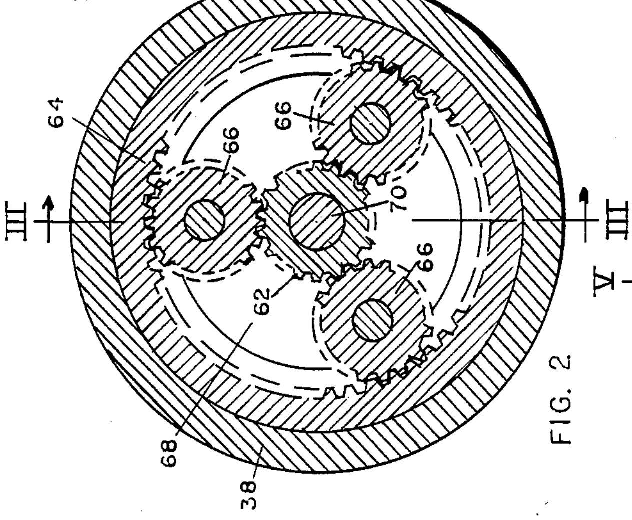
Figure 4:
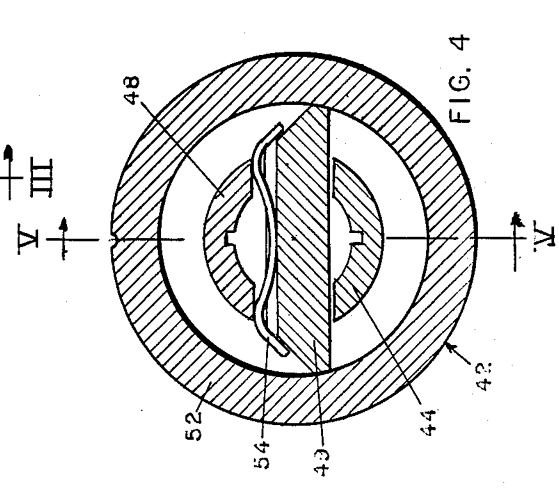

With these objects in view, as well as other objects which will appear in the course of the specification, reference will be had to the accompanying drawing, wherein:

FIG. 1 is a longitudinal sectional view of a valve operator embodying the present invention, with parts left in elevation, FIG. 2 is an enlarged sectional view taken on line II—II of FIG. 1, FIG. 3 is a fragmentary sectional view taken on line III—III of FIG. 2, FIG. 4 is an enlarged sectional view taken on line IV—IV of FIG. 1, showing only one of the non-reversing torque control devices, FIG. 5 is a sectional view taken on line V—V of FIG. 4, and FIG. 6 is an enlarged, fragmentary sectional view taken on line VI—VI of FIG. 1.

Like reference numerals apply to similar parts throughout the several views, and in FIG. 1, the numeral 2 designates a generally rectilinear valve operator housing, said housing having a removable cover 4 and a base plate 6, which may be provided with holes 8 or the like permitting it to be bolted to the bonnet flange of a valve to be controlled by the operator. The stem 10 of the valve rises through the base plate into the housing. As selected for illustration, the valve is of the rising-stem type, its stem 10 being threaded and non-rotatable. The stem is raised to open the valve (the stem is shown in the valve-open position) and lowered to close the valve, being raised and lowered by rotation of a stem nut 12, said nut being secured against vertical movement by an opening thrust bearing 14 and a closing thrust bearing 16, the bearing 16 being held down by a retainer nut 18 threaded into a fixed sleeve 20 surrounding the stem nut. Fixed to and rotatable with the stem nut is an upwardly facing bevel gear 22, which is driven by a bevel pinion gear 24 fixed on a horizontal shaft 26 supported rotatably in a ball bearing 28 mounted in sleeve 20. Shaft 26 is driven by the operating means to be described hereinbelow. Said shaft may be turned either by power delivered by a reversible electric motor 30 mounted in housing 2 in coaxial alignment with shaft 26, or by a manually operable handwheel 32, which turns a shaft 34 extending into the housing in parallel but transversely offset relation to shaft 26. Motor 30 turns shaft 26 through planetary gearing carried in a planetary gear case 36 fixed in housing 2, and through planetary gearing carried in a rotatable planetary case 38 disposed in axial alignment with case 36. Fixed case 36 is separated from motor 30 by a sleeve 40 fixed to said case and to the housing of the motor. Said sleeve has a non-reversing torque control device indicated generally by the numeral 42 fixed therein. As best shown in FIGS. 4 and 5, said torque control device comprises a driving sleeve 44 mounted rotatably at one end thereof by ball bearings 46, a driven sleeve 48 mounted rotatably at the opposite end thereof by bearings 50, and a lock ring 52 disposed longitudinally intermediate said driving and driven sleeves. The inner end portions of said sleeves are segmental, being of less than full cylindrical extent, and a lock bar 49 extends generally diameterically of the locking ring between the segmental sleeve portions. Said lock bar is of a length slightly less than the full internal diameter of the lock ring, so as to engage the interior surface of said ring slightly to one side of center, as shown in FIG. 4. A leaf spring 54 is based in a groove formed longitudinally in the locking bar 49 at the side thereof facing the segmental portion of driven ring 48, and is compressed against said segmental portion, whereby to bias the ends of the lock bar into firm wedging engagement with the interior of ring 52. Referring to FIG. 3, it will be seen that the stub shaft 56 of motor 30 is engaged non-rotatably in the full cylindrical portion of driving sleeve 44, and that an output shaft 58 of the device is engaged non-rotatably in the full cylindrical portion of driven sleeve 48. Both the driving and driven sleeves, as well as lock ring 52, may be locked against rotation within sleeve 40 by a pin key 60. Thus, whenever torque is applied to driving sleeve 44, in either direction, by motor 30, the segmental portion of sleeve 44 presses lock bar 49 toward the center of the lock ring against the pressure of spring 54. This frees the ends of the lock bar from the lock ring, so that sleeve 44 then acts through the lock bar to turn the driven sleeve 48, and the shaft 58 connected therein. On the other hand, if shaft 58 applies torque to sleeve 48, in either direction, its segmental portion merely presses lock bar 49 into still tighter wedging engagement with lock ring 49, and sleeve 48 is locked against rotation.

Shaft 58 extends into fixed planetary case 36, and has affixed thereto within said housing the central pinion gear 62 of a planetary gear set carried in said case. Said gear set also includes a ring gear 64 mounted rotatably in case 36 in coaxial surrounding relation to pinion 62, and a series of angularly spaced planet gears 66 interposed between and meshing with the pinion and ring gears. The planet gears are mounted rotatably, each for rotation about its own axis, on a spider disc 68 which is itself rotatable about the central axis of the planetary system, being provided with a central shaft 70 which is carried rotatably in a ball bearing 72 which connects fixed planetary case 36 with rotatable planetary case 38, and which extends into said rotatable planetary case. Within case 38, shaft 70 has the central pinion 62 of another planetary gear set affixed thereon, similar in virtually all respects with the set described as contained in fixed case 36, including said central pinion, a ring gear, planet gears and a spider, bearing corresponding identifying numerals as indicated in FIG. 2. Any desired number of gear sets (two shown) may be mounted in series in case 38, depending on the speed reduction ratio desired, with the spider shaft of each set turning the central pinion of the next successive set, and the spider shaft of the final set constituting the shaft 26 which projects outwardly from case 38 and on which bevel pinion gear 24 is mounted. As shown, each of the three planetary gear sets shown produces a speed reduction of 4 to 1 between its central pinion 62 and its spider shaft 70, so that there is a total speed reduction of 64 to 1 between the motor and shaft 26, provided that the ring gears 64 of the rotatable planetary case 38, and the case itself, are locked against rotation. Said ring gears are fixed non-rotatably in the case, and the case itself is locked against rotation, in motor operation, by a gear 74 concentric with said case and formed integrally therewith, said case gear being meshed with a gear 76 fixed on handwheel shaft 34. Said handwheel shaft is connected to handwheel 32 by a non-reversing torque control device 78 mounted in a sleeve 79 fixed to housing 2. Device 78 is similar in all respects to device 42, with the handwheel connected to the driving side thereof, and shaft 34 connected to the driven side thereof. Thus, rotation of handwheel 32 will operate through gears 76 and 74 to rotate case 38, said case utilizing the outer race of ball bearing 72 as a simple sleeve bearing, but the torque control device will lock said case against rotation in a reverse direction.

Unlike the ring gears 64 in rotatable planetary case 38, the ring gear within planetary case 36 is rotatable to a slight degree within case 36, having a radial arm 80 affixed thereto and extending radially outwardly therefrom through an aperture 82 provided therefor in a wall of said case. Outwardly of said case, said arm is braced yieldably against rotary movement thereof by a pair of springs 84 disposed respectively at opposite sides thereof, each of said springs being compressed between said arm and a screw 86 threaded in a box 88 integral with case 36. By turning said screws, the tension of said springs may be adjusted to hold arm against any rotary torque applied to ring gear 64 in normal motor operation of the planetary gear set in case 36. However, when a predetermined higher torque is applied to said ring gear, as when a predetermined higher torque is applied to said ring gear, as when seating or unseating the valve controlled by the operator, arm 80 will move in one direction or the other, against the tension of one spring 84 or the other, sufficiently to engage one or the other of a pair of electric switches 90 mounted in box 88, and to actuate said switch to interrupt the supply of electric current to motor 30. Switches 90 thus serve as torque limit switches for preventing damage to the motor resulting from overloading thereof.

Operation of the device is believed to have been reasonably well set forth in the foregoing description of its construction. When operation of the valve by motor 30 is desired, the motor is actuated and acts through non-reversing torque control device 42 to drive the single set of planetary gears in fixed case 36 and the two sets of planetary gears in rotatable planetary case 38 to drive shaft 26, which in turn acts through bevel gears 24 and 22 and stem nut 12 to raise or lower valve stem 10 to open or close the valve, as may be desired. The three planetary gear sets function as though they were all contained within a single fixed gear case, since rotatable case 38 is then fixed against rotation by torque control device 78. The speed reduction obtained by the planetary gearing is quite high, in order to prevent operation of the valve at too high a speed. As previously mentioned, the speed reduction with the gears as shown is 64 to 1, although the speed reduction actually provided is of course a matter of design choice, and is a function of the ratios of the ring gears 64 and central pinion gears 62 of each gear set, and of the number of gear sets provided. The locking of device 78 to prevent rotation of handwheel 32 in motor operation also prevents the impractical and possibly dangerous condition which could then exist if the handwheel were operable from remote locations by reach rods or flexible shafting, as is the case in many marine and naval installations.

In handwheel operation of the valve, the handwheel is turned manually, and functions through device 78 and gears 76 and 74 to turn rotatable planetary case 38. At the same time, operation of the planetary gear set within fixed planetary housing 36 is locked, due to the fact that the case 36 is stationary and fixed, and central pinion 62 is locked by the non-reversibility of device 42. This also locks the central pinion 62 of the first planetary gear set in rotatable housing 38. Thus when case 38 is rotated by operation of the handwheel, the first ring gear 64 in case 38 turns its associated planet gears 66 around the locked pinion 62, which in turn rotates the first spider 68, which acts to turn the second pinion 62 of case 38, around which the second set of planet gears 66 are turned by the second ring gear, so that shaft 26 is turned to drive bevel gears 24 and 22 to open or close the valve. There is still a speed reduction between the rotation of case 38 and the rotation of shaft 26, but a much smaller reduction. Again, with the gears as shown, each 16 turns of case 38 will produce 15 turns of shaft 26, which permits handwheel operation of the valve with only a fraction of the turns which would be required of motor 30 in motor operation. This nearly one-to-one ratio of turns of the handwheel required to produce one turn of shaft 26 may be still further improved by making gear 76 larger than case gear 74, as shown. If gear 76 is provided with double the number of teeth of gear 74, then eight turns of the handwheel will produce 15 turns of shaft 26. This low speed reduction, or even a speed increase ratio, is very important in handwheel operation, since if the same number of handwheel turns were required in handwheel operation as the number of motor revolutions required in motor operation, handwheel operation would be so tedious and time-consuming as to be totally unacceptable. The actual speed reduction or speed increasing ratio between the handwheel and shaft 26 is also a matter of design choice, and may be varied by changing the gear ratios of the planetary gear sets in rotatable case 38, or the ratio of gears 74 and 76. The greater the speed reduction provided by the planetary gear sets in motor operation, the more nearly the speed ratio between the handwheel and shaft 26 in handwheel operation will approach a one-to-one value. The locking of torque control device 42 in handwheel operation also permits handwheel operation even in the event motor 30 siezes or is otherwise locked against rotation. This is a safety provision. The inclusion of one planetary gear set in fixed gear case 36, while the others are in a rotatable gear case, is to permit the set in the fixed case to sense the elevated torque for the purpose of operating torque limit switches 90. Actually, all the planetary gear sets could be mounted in a single rotatable housing, if torque limit protection is not desired, of if the torque limit switches were disposed at other possible locations.

The planetary gear sets carried in rotatable gear case 38 may be regarded as two separate gear trains each operable to deliver power to the valve actuating means characterized in the drawing as bevel gears 22 and 24 and stem nut 12, the two gear trains being operable respectively to deliver power at two different speed reduction ratios, a relatively high reduction ratio if the power input is to the central pinion gear 62 of the first planetary gear set in the housing, and a relatively low reduction ratio if the power input is to the ring gear 64 of the first planetary gear set. Also, the valve actuating means including bevel gears 22 and 24 is exemplary only, being applicable only to rising-stem valves such as gate valves. In plug valves, opening or closing is normally accomplished by a quarter-turn of a non-rising stem, and in that case, shaft 26 could have a worm pinion fixed thereon, and meshed with a worm gear fixed on the non-rising stem.

Torque control devices 42 and 78 should not be regarded as clutches. Both provide substantially constant and unbroken connection between their driving means, either the motor or the handwheel, and the valve actuating means to be driven thereby. The motor and the handwheel could in fact be operated simultaneously, if there were any reason to do so, and both would be fully operative. The locking of their lock bars 49 in locking rings 52 does not sever the driving connections to the valve actuator, but leaves said driving connections intact. The locking action serves only to lock the driven elements against rotation by torque applied thereto by any means other than the driving elements, which not only allows operation of the other driving means, either motor or handwheel, when said other driving means is in use, but also serves as a safety measure to prevent any "kickback" from one driving means to the other whenever one driving means is actuated while the other is in use. This safety provision is particularly important if the motor should be actuated while the handwheel is in use. It also permits switching from motor to handwheel operation, or vice versa, with no requirement for any additional operation such as the manual movement of a clutch operating lever or the like.

While we have shown and described a specific embodiment of our invention, it will be readily apparent that many minor changes of structure and operation could be made without departing from the spirit of the invention.

What we claim as new and desire to protect by Letters Patent is:

1. A valve operator comprising:

a. valve actuating means operable when driven to open or close a valve, depending on the direction of drive, b. a motor, c. a manually operable handwheel, d. a pair of drive trains respectively interconnecting said motor and said handwheel to said valve actuating means whereby each may be caused to drive said valve actuating means selectively in either direction and e. a pair of non-reversing torque control device interposed respectively in each of said drive trains, each of said torque control devices having a driving member interconnected to and driven by either said motor or said handwheel, and a driven member connecting said driving member to said valve actuating actuating means, and each being operable to allow either said motor or said handwheel to drive said valve actuating means in either direction, but to lock to prevent turning of the driven member thereof in either direction in response to torque applied to said driven member by any means other than said driving member, each of said torque control devices comprising a rotatable driving sleeve directly connected to and driven by said motor or by said handwheel, as the case may be, a rotatable driven sleeve axially aligned with said driving sleeve and connected to said valve actuating means by the remainder of its associated drive train, said driving and driven sleeves having axially extending segmental portions projecting into axially overlapping, transversely non-aligned relation, a fixed lock ring surrounding the axially overlapping segmental portions of said driving and driven sleeves, a generally straight lock bar extending generally diametrically between said axially overlapping segmental sleeve portions, and being of slightly less length than the internal diameter of said lock ring, and a spring biasing said lock bar transversely of itself toward the segmental portion of said driving sleeve to wedge between generally opposite interior walls of said lock ring to lock said driven sleeve against rotation by torque applied thereto, torque applied to said driving sleeve being operable to move said lock bar transversely of itself toward the segmental portion of said driven sleeve to release it from its wedging engagement in said lock ring, whereby rotation of said driving sleeve functions to turn said driven sleeve through said lock bar.

* * * * *